Patented May 23, 1933

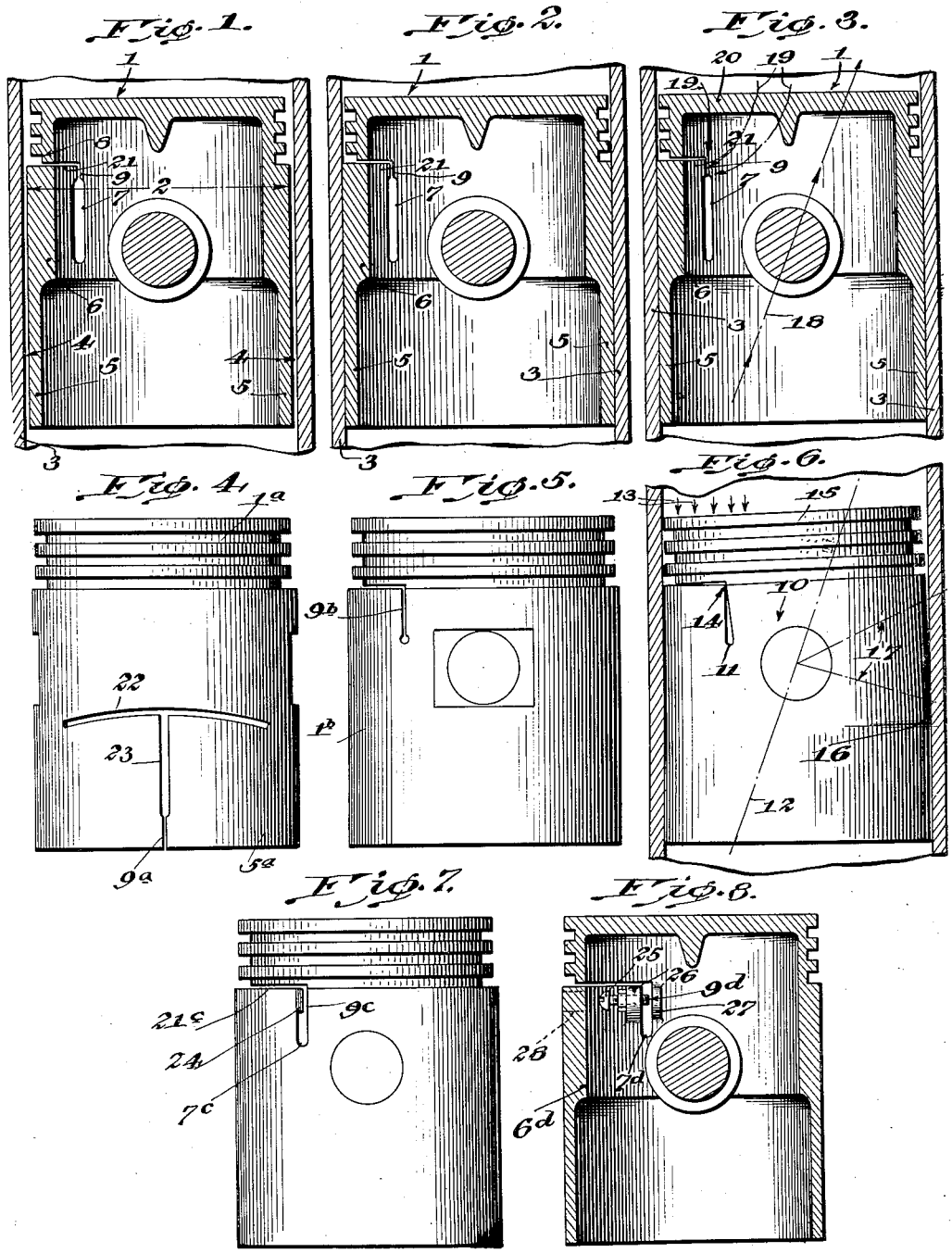

1,911,103

UNITED STATES PATENT OFFICE

ZENO ARNO BRUEGGER, OF BOISE, IDAHO

METERED-KERF PISTON

Application filed February 25, 1932. Serial No. 595,189.

This invention relates to improvements in pistons, and its objects are as follows:—

First, to provide a piston with a kerf which is measured or metered to agree with the expected over-expansion of the piston when heated in its work, so that the sides of the kerf will close into abutting relationship to produce a virtually solid piston which, by virtue of this quality, will be protected from distortion, breakage and destruction under the crushing force of compression while said piston is between tremendous power impulses and crank shaft load resistance.

Second, to provide a piston with a kerf or kerfs metered at one or both ends, that is to say, so calibrated or otherwise restricted as to size, that after the piston has expanded the initial amount to a substantial fit within the cylinder the additional or over-expansion of the piston will be limited in the metered part of the kerf or kerfs and either close or nearly close at said metered parts so that the sides of the metered kerfs abut and so prevent distortion or collapse of the piston under the crushing force of compression resistance when the piston makes its inward or compression strokes, or while it is being wedged against the thrust side of the cylinder, between the tremendous power impulses and the crank shaft load resistance below.

Third, to provide the kerf of a piston with a reduced extremity which is metered to substantially agree with the expected over-expansion of the particular piston under the influence of heat in its work.

Fourth, to apply the foregoing principle to any piston, plunger or the like which is split for expansion clearance.

Other objects and advantages will appear in the following specification, reference being had to the accompanying drawing in which Figure 1 is a sectional view of a piston having a metered kerf, the metered part of the kerf comprising a reduction at the extremity of what may be considered an ordinary kerf.

Figure 2 is a sectional view of the same piston illustrating the result of the preliminary heating effect during which the skirt portion of the piston expands to a substantial fit within the cylinder.

Figure 3 is a similar sectional view showing how the sides of the metered kerf abut when the limit of over-expansion of the piston has been reached, thus converting the piston into a virtually solid element the erectness of which is insured within the cylinder as well as its defense against the crushing strains of compression.

Figure 4 is a detail view illustrating the principle of metering a kerf of a type different from that in Figure 1.

Figure 5 is an elevation of a piston wherein the entire kerf is metered to compensate for the total expansion of the piston.

Figure 6 is a diagrammatic view illustrating the effect of the crushing strains of compression on a piston which lacks a metered kerf.

Figure 7 is a detail view of a piston making use of shims to define the metered kerf.

Figure 8 is a sectional view of a piston illustrating the use of an adjustable set screw for producing the metered kerf.

The following description is devoted to an application of the invention to an automobile engine piston, but it must be understood that the principle is not so limited because it will operate to equally good effect in pistons of other types, plungers, etc. which have cuts, kerfs or splits for the purpose of compensating for expansion.

It is the prevailing practice in the automobile industry to employ alloy pistons because of their lightness, strength and ability to conduct the heat away rapidly. An alloy piston is subject, under similar circumstances, to a far greater degree of expansion than an ordinary gray iron piston, making it necessary to allow a greater initial clearance between the alloy piston and the cylinder wall than between a gray iron piston and the cylinder wall.

If this clearance was not provided the piston would stick in the cylinder, not only to the ruination of the piston but to the damage of other parts of the engine as well. It is not feasible to compensate for the entire expansion of an alloy piston by clearance alone between the outside of the piston and the cylinder wall, the prevailing custom being to split or kerf the piston in any one or combination of ways in order to compensate for an amount of over-expansion after the initially allowed space for expansion between the piston and cylinder wall has been taken up.

It has been the practice of manufacturers to kerf a piston with almost any size or width of cutter with the idea in mind that so long as the kerf was wide enough to insure against seizure the requirement has been met. This practice has led to the tendency of generally making the kerf far too wide thus making the piston too frail for the tremendous pressure which it confronts on its compression strokes.

The crushing effect of compressed fluid ahead of the piston manifests itself by distorting or breaking the piston because of the kerf being so wide that the resistance of the wall structure has been seriously impaired. The invention comprises an improvement of the kerf so that the erstwhile split piston is converted into a virtually solid piston after it has been expanded to the maximum by the heat engendered in its work.

Figures 1, 2 and 3 illustrate a piston 1 which, for the purpose of this description, is to be regarded as 3⅞" in normal diameter across the distance 2. This piston is fitted in a cylinder 3 which is of such proportions that there will be an initial clearance of .002" on all sides as at the points 4, in other words a total clearance of .004" across the diametrical dimension. The piston has an inherent capacity of .009" of expansion.

When the piston starts to get hot the first effect is an expansion of the piston skirt 5 until it substantially fits the bore of the cylinder 3 (Fig. 2), said expansion causing what is known as the contact shoe 6 to move over into engagement with the adjacent wall of the cylinder. This initial expansion has thus far consumed .004" clearance denoted at the points 4 (Fig. 1), but the maximum inherent expansive capacity of the piston is .009" thus leaving .005" yet to be accounted for.

In an ordinary piston this over-expansion would be compensated for by an abnormally wide kerf, but the improved kerf by which the .005" over-expansion is compensated for is arranged as follows:—

The skirt 5 is split or slotted on opposite sides as indicated in one place at 7 (Fig. 1) at a place adjacent to the bottom ring groove 8. In an ordinary piston these slots would be approximately .032" in width and may be regarded as of that width in Figures 1, 2 and 3. But the upper terminals or extremities 9 are reduced to a dimension of .0025", the two extremities totaling .005" representing the foregoing over-expansive capacity of the piston. The terminals 9 are therefore regarded as kerfs which are measured or metered to agree with the expected over-expansion of the piston.

Now, as to the piston continues to heat up, each metered terminal or reduced gap 9 will close, and inasmuch as the sides of the gap then come together (Fig. 3) it follows that one side acts as an abutment for the other, making the erstwhile split piston a virtually solid element which is immune to the destructive compression force which is now explained. For this purpose it is necessary to digress a moment for a consideration of Figure 6.

This figure is a diagrammatic illustration of some known type of piston 10. This piston is kerfed at 11 in a manner similar to the improved piston in Figure 1 in order to make the conditions the same, the kerfs starting from the bottom ring groove in each instance. The kerf 11 is regarded as being .032" wide whereas the expansive capacity of the piston 10 is .009".

The initial expansion of the piston produces a substantial fit of the piston in the cylinder bore, and the overexpansion causes a partial closure of the kerf 11. Assuming the piston to be moving on a compression stroke along the direction line 12 it follows that the compression resistance, denoted by the arrows 13, will preponderate on the left side of the line 12 and cause a crushing together of the kerf 11 at the point 14, thereby permitting a canting of the head 15 and the right side of the skirt 16 so that the piston 10 assumes an unaligned position in the cylinder bore and at the same time is subject to a breaking tension within the zone 17.

Considering the improvement under the same condition, when the piston 1 is driven inwardly on a compression stroke along the direction line 18 (Fig. 3), the compression resistance denoted by the arrows 19 is definitely centered at the now closed metered kerf 9. The head 20 is therefore supported in a level position, and there is no possibility of either it or the right side of the skirt 5 canting as in Figure 6. The second effect of the metered kerf 9 is to insure the keeping of the piston 1 in a perfectly erect working position within the bore of the cylinder so that it can never shift out of axial alinement or force the rings to dig into the bore and set up that abnormal wear on the walls of the cylinder which distort the latter into an egg shape.

The bottom ring groove is cut in far enough at 21 to provide an open place with which the split 7 may communicate through the metered kerf 9. The cut-in place together with the split 7 and kerf 9 define that portion which becomes the contact shoe 6. According to this arrangement there is a duplicate split 7 and metered kerf 9 on what would be the near and unseen side of the piston in Figure 1.

It is not necessary to always adhere to the particular form of metered kerf in Figure 1 because this is subject to considerable variation. It may be found desirable to provide the split 7 with metered kerfs at both extremities, and in this and other modifications presently described the reduced space is to be regarded as the metered kerf regardless of how it is formed because the one principle will prevail in all instances.

Figure 4 illustrates a type of piston 1ª wherein the skirt 5ª is provided with slots 22, 23 of a T arrangement. That end of the slot 23 which extends toward the bottom rim of the skirt 5ª terminates in a metered kerf 9ª according to the principle in Figure 1. The over-expansion of the piston will close the kerf 9ª until the sides abut.

In Figure 5 the kerf 9ᵇ is to be regarded as metered to the over-expansion of the piston 1ᵇ substantially its entire length. There is no well defined limit to the length of the metered kerf, but in Figure 5 the sides of the kerf 9ᵇ will abut when the piston 1ᵇ has reached the maximum of its expansion just as in Figure 1.

Figure 7 illustrates the use of shims 24 for the production of the metered kerf 9ᶜ. These shims may be applied to one or both sides of the split 7ᶜ, usually at a place adjacent to the cut-in place 21ᶜ. The shims may be held in position by any known mechanical expedient, and may be employed to control kerfs and their width, at any desired location of a given piston.

In Figure 8 the metered kerf 9ᵈ is produced by a set screw 25. This set screw may be mounted on the piston in such a way that its point will directly confront the opposite side of the split 7ᵈ, but for convenience of illustration the screw is shown mounted in a lug 26 so that its point confronts a lug 27 on the other side of the split. An appropriately made opening 28 in the upper part of the contract shoe 6ᵈ provides access for the original emplacement and subsequent adjustment of the set screw. Said set screw will usually be placed near the open end of the piston kerfing to gain the desired meter control.

There is a further variation in making the metered kerf which is as follows:— Taking the diametrical size and coefficient of expansion of the piston in Figure 1, it is also contemplated to make the kerf 9 of a width slightly in excess of the expected over-expansion so that the sides of the kerf 9 will not quite touch when the piston has reached its maximum expansion. For example, instead of making the kerf 9 .005" wide it may be made .006" wide.

The additional .001" is to be regarded as a factor of safety, anticipating any unexpected over-expansion of the piston which, if making itself evident, would tend to cause the piston to stick in the cylinder bore. The .001" excess gap, if not consumed as indicated, will simply close when the piston opposes the compression resistance 19, but the bending effect on the structure of the piston will be so infinitesimal as to be completely absorbed in the mass of metal.

It must be understood that the dimensions of the split 7 and metered kerf 9 as well as the amounts of expansion of the piston 1 constitute only one example. A piston of another size would require a different amount of cylinder clearance and would have a different total expansion. The determination of the size of the metered kerf 9 is predicated on a determination of the initial expansion of a given piston up to the point of substantially fitting the cylinder bore, and then the over-expansion during which the maximum enlargement of the piston occurs.

It is stated above that the application of the principle is not intended to be limited to a piston. A piston is cited merely as an instance of the application of the principle. The metered kerfing is capable of being employed in any expansible body wherein it is a consideration to render a split body virtually solid after its allowable expansion has occurred entirely or substantially so.

I claim:—

1. A body having cut-ins to define a contact shoe, and means mounted on one wall of a portion of each cut-in in spaced and confronting relationship to the opposite wall of said portion of the cut-in to provide kerfs of a closeable size substantially equal to a predetermined factor of expansion of the body.

2. A body having cut-ins to define a contact shoe, and a shim mounted on one wall of a portion of each cut-in, in spaced and confronting relationship to the opposite wall of the respective cut-in.

3. A body having cut-ins to define a contact shoe, and means which is mounted on one wall of each cut-in to reduce the width of a portion of the respective cut-in.

4. A body having cut-ins to define a contact shoe, and an adjustable set screw mounted adjacent to one wall of a portion of each cut-in, in spaced and confronting relationship to the opposite wall of the respective cut-in.

5. A piston having a substantially vertical slot in one of its thrust sides to permit expansion, and calibrated means in said piston for preventing fracture of the piston under working conditions.

6. A piston having head and skirt portions, a portion of the skirt being severed from the head and a substantially vertical slot terminating at the upper edge of the severed portion of said skirt, the upper portion only of said slot being metered to provide a space which is closed when the piston is under severe compression.

7. A piston having a skirt portion separated from the head by a horizontal slot on one side of the piston and a substantially vertical slot having a wide and a narrow portion communicating with said horizontal slot, the width of the narrow portion of said vertical slot being predetermined so that when the piston is under severe compression the said narrow portion of the slot will be completely closed.

8. An annulus subject to reciprocatory motion in the cylinder of an engine and subject to expansion from heat engendered by the operation of the engine, said annulus having a metered split defining confronting ends, said split providing a metered space which is closed to bring said ends into abutment by a predetermined factor of expansion of said annulus due to the foregoing engine heat.

ZENO ARNO BRUEGGER.